(12) United States Patent
Dave et al.

(10) Patent No.: US 9,460,608 B2
(45) Date of Patent: Oct. 4, 2016

(54) REMINDER CREATION FOR TASKS ASSOCIATED WITH A USER EVENT

(75) Inventors: Swapnil Dave, Santa Clara, CA (US); Devrim Varoglu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 614 days.

(21) Appl. No.: 13/613,586

(22) Filed: Sep. 13, 2012

(65) Prior Publication Data

US 2014/0070945 A1 Mar. 13, 2014

(51) Int. Cl.
*G08B 21/24* (2006.01)
*G06Q 10/10* (2012.01)

(52) U.S. Cl.
CPC ............ *G08B 21/24* (2013.01); *G06Q 10/109* (2013.01)

(58) Field of Classification Search
CPC .............................. G08B 21/24; G06Q 10/109
USPC ................... 340/309.7, 309.16, 500, 539.11, 340/539.12, 540, 573.1; 715/234, 235, 751; 707/736, 796; 709/796; 725/14, 38, 58, 725/112, 139
See application file for complete search history.

(56) References Cited

U.S. PATENT DOCUMENTS

| 8,631,448 B2* | 1/2014 | Christensen et al. ........... 725/58 |
| 8,745,661 B2* | 6/2014 | Ellis et al. ...................... 725/38 |
| 2005/0221808 A1* | 10/2005 | Karlsson ........... H04M 1/72563 455/418 |
| 2006/0190313 A1* | 8/2006 | Lu ..................................... 705/8 |
| 2006/0220799 A1* | 10/2006 | Boss et al. ............... 340/309.16 |
| 2007/0072629 A1* | 3/2007 | Bae ................... H04M 1/72566 455/461 |
| 2008/0004926 A1 | 1/2008 | Horvitz |
| 2010/0273460 A1* | 10/2010 | Dorbie ....................... 455/414.1 |
| 2011/0148632 A1 | 6/2011 | Chin |
| 2013/0036117 A1* | 2/2013 | Fisher et al. ................... 707/736 |
| 2013/0054720 A1* | 2/2013 | Kang ..................... G06Q 50/01 709/206 |
| 2013/0198652 A1* | 8/2013 | Dunn et al. .................... 715/751 |
| 2014/0067455 A1* | 3/2014 | Zhang et al. ................ 705/7.24 |

* cited by examiner

*Primary Examiner* — Van Trieu

(74) *Attorney, Agent, or Firm* — Blank Rome LLP

(57) ABSTRACT

An event analysis engine on a user device may be configured to receive information representative of a user event and to determine a type of the event according to the received information. One or more tasks associated with the determined type of event may be identified. Each of the identified tasks may be associated with a reminder having a trigger condition that is a function of information specific to the task. The task-specific information may be retrieved and the reminders associated with the tasks may be displayed when a device condition matches a calculated trigger condition for the reminder. Each task may be identified as completed when a completion condition associated with the task is satisfied.

24 Claims, 5 Drawing Sheets

REMINDER CREATION FOR TASKS ASSOCIATED WITH A USER EVENT

BACKGROUND

This disclosure relates generally to the generation of reminders by a device in accordance with an identified user event. More particularly, the disclosure relates to the generation of multiple inter-related reminders for tasks associated with an event.

Devices such as mobile phones, personal music players, tablet computers, and other similar devices have become an integral part of many users' lives. Because such devices are so commonly in the possession of a user, they are often utilized to provide reminders for upcoming events to a user. For example, a user may configure reminders for future events (e.g., a doctor's appointment, a meeting, a flight, etc.) such that the user will be provided with a notification as the event approaches. Notifications generated by these existing applications occur based on fixed trigger conditions provided by a user. That is, a reminder may be configured to occur at a specified time or when the user arrives at a specified location. Therefore, existing reminder applications merely notify a user when the specified trigger conditions are satisfied and are incapable of adjusting to changes in the underlying event for which the reminder was configured. Moreover, although many types of events may be associated with multiple tasks for which the user would desire a notification (e.g., a notification to obtain a dinner reservation, a notification to depart for the restaurant, etc.), due to the limited flexibility of existing reminder applications, a user may typically create a single finder having a single trigger condition for an event. It would therefore be desirable to provide an application with an awareness of the tasks associated with different types of events and that was capable of identifying changes in event conditions and, in response, modify the trigger conditions for one or more reminders related to the event.

SUMMARY

In one embodiment, a method is provided to identify a user event and to generate one or more task-based reminders associated with the user event based on the type of the event and underlying conditions of the event. The method may include receiving, at a device, information that is representative of the user event. Based on the received information, a type of event may be determined. One or more tasks that are associated with the determined type of event may then be identified, and each of the tasks may be associated with a reminder having presentation conditions that are based on information specific to the task. The information that is specific to each of the tasks may be retrieved by the device and the reminder associated with each task may be presented based on the task-specific information. The method may be embodied in program code and stored on a non-transitory storage medium. The stored program code may be executed by a processor that is part of, or controls, the device.

DETAILED DESCRIPTION

This disclosure pertains to systems, methods, and computer readable media for identifying a user event and creating reminders for various tasks associated with the user event. In general, techniques are disclosed for identifying a user event, determining the type of the event, identifying one or more tasks associated with the event, and generating reminders for the tasks associated with the event. In another embodiment, changes to aspects of the event may be detected and, based on those changes, the generated reminders may be modified.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another, It will also be appreciated that such development efforts might be complex and time-consuming, but would nevertheless be a routine undertaking for those of ordinary skill in the art of electronic device operations having the benefit of this disclosure.

Figure 1:
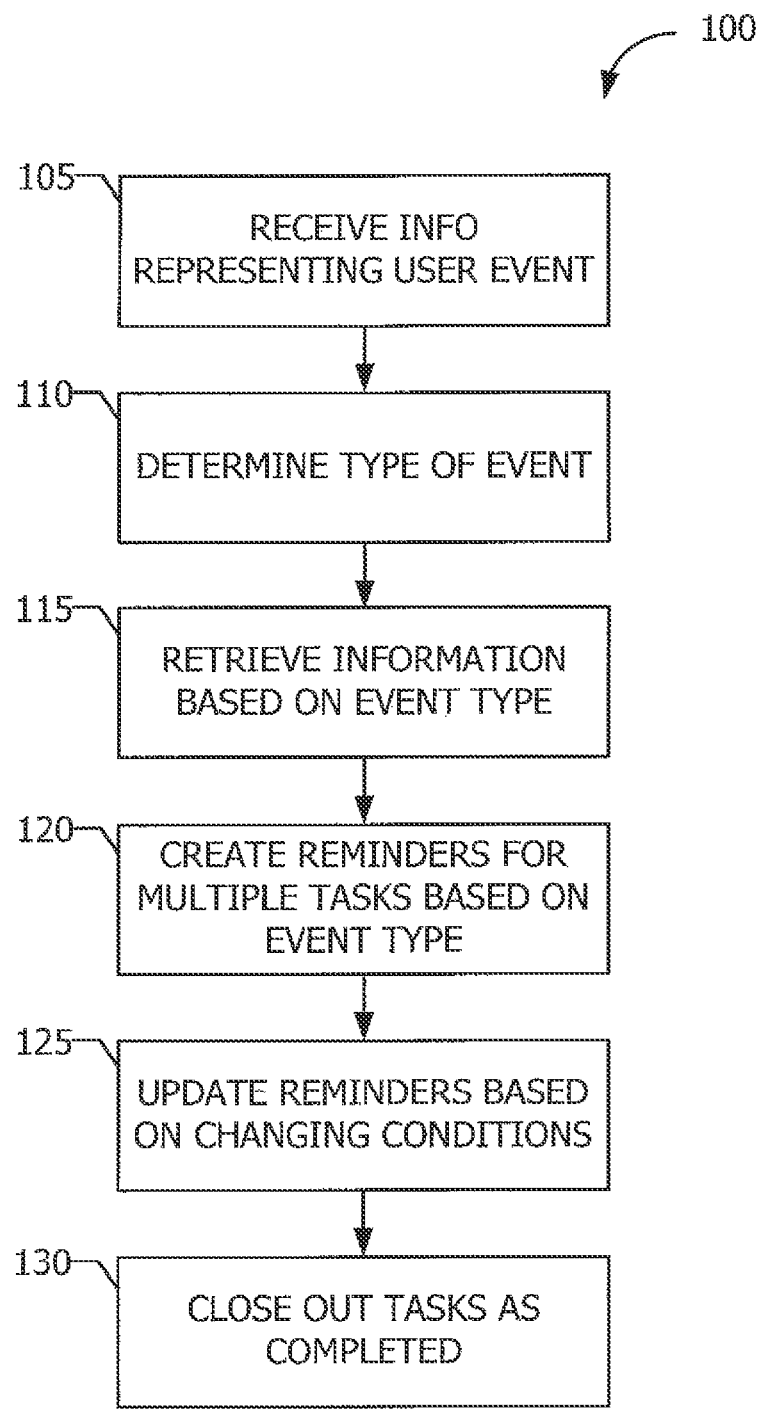
FIG. 1 is a flowchart that illustrates an operation to generate one or more reminders in accordance with one embodiment.

Referring to FIG. 1, reminder creation operation 100 may begin when information representing a user event is received by an event analysis engine executing on the user's device (block 105). The event analysis engine may function as a stand-alone application or may be integrated with the device's operating system. The received information may be representative of any type of event for which the user ay desire to receive one or more reminders. For example, the user event may be a meeting, a dinner, a scheduled flight, a doctor's appointment, etc. As will be described in greater detail below, the event analysis engine may receive information describing the event in a number of different manners. In one embodiment, the information may be received based on direct user input. For example, the user may request that the device generate a reminder for an upcoming appointment. In such an embodiment, the request may be received as a voice command, text input, menu selection, or other input recognizable by the device. In another embodiment, the information may be received based on the utilization of an application executing on the device. For example, the user may purchase a movie ticket utilizing an application on the device and the event analysis engine may retrieve information describing the purchase from the application and may determine that the information is representative of an event for which the user may desire the generation of a reminder. In still another embodiment, the information may be received based on a communication received or transmitted by the device. For example, an email from an airline confirming a flight reservation may be retrieved by the event analysis engine and the event analysis engine may determine that the communication is representative of an event for which the user may desire the generation of a reminder.

Upon receiving information that represents (or potentially represents) a user event, the type of event may be determined by the event analysis engine (block 110). In one embodiment, the event analysis engine may utilize the received information to determine whether it is representative of a type of event from a group of predefined event types. Such predefined event types may include doctor's appointments, business meetings, dinners, movies, etc. In one embodiment, the event analysis engine may extract data from the received information to determine the type of event. For example, information from a received email that is identified as corresponding to a known airline confirmation email address may be utilized to determine that the received information is representative of a scheduled flight event type, Similarly, payment information received from an application that corresponds to a movie theater may be utilized to determine that the payment information is representative of a movie event type. In another embodiment, the event analysis engine may request information from the user to determine an event type. For example, upon receiving information that is potentially associated with a user event, the event analysis engine may present some or all of the information to the user and may then prompt the user to indicate whether the information is associated with an event for which a reminder should be generated, and, if so, to specify the type of event.

Additional information related to the event may be retrieved based on the determined type of event (block 115). The determined type of event may be associated with the generation of reminders for tasks related to the event. For example, an event identified as a dinner event without a confirmed reservation may be associated with a reminder to obtain a reservation (if the restaurant accepts reservations) or to call ahead and be placed on a waiting list (if the restaurant accepts call-ahead seating), a reminder to depart for the restaurant (e.g., based on a desired dinner time, the user's location, the location of the restaurant, traffic, etc.), a reminder associated with available parking (e.g., presented as the user approaches the location of the restaurant), etc. It will be understood that in order to properly construct reminders for tasks associated with a determined type of event, it may be necessary to identify additional information related to the event. In one embodiment, some or all of the information needed based on the determined type of event may be contained in the received information the information received at block 105). For example, it may be determined that a received email includes information for a dinner reservation type of event and identifies all of the information necessary to create task reminders for the determined event type (e.g., the time of the reservation, the name of the restaurant, and the location of the restaurant). In another embodiment, information contained within the received information may be utilized to retrieve the additional information necessary to create task-based reminders for the determined event type. For example, an airline, reservation date, and flight number may be extracted from information retrieved from an application on the user's device utilized to make a reservation for a flight. The airline, date, and flight number may then be utilized to retrieve the additional information necessary to create task-based reminders for the flight event (e.g., domestic/international flight, departure airport and time, arrival airport and time, connecting flights, etc,). In such an embodiment, the additional required information may be retrieved either directly or indirectly by the event analysis engine. For example, the event analysis engine may submit a direct request for the desired information to a web server associated with an airline or may request the information indirectly through an application installed on the user's device (e.g., a travel management application). In yet another embodiment, the event type may be identifiable from the received information but information necessary to create the task-based reminders associated with the determined event type (or to retrieve the necessary information) may be absent in the received information. In such an embodiment, the event analysis engine may prompt the user to provide the necessary information for the determined event type (or information that would allow the analysis engine to retrieve the necessary information). As will be described in greater detail below, the retrieved information may be utilized in the content of task-based reminders and to calculate target reminder conditions (i.e., target conditions for the presentation of the reminder) for the task-based reminders associated with the event.

After the necessary information has been retrieved by the event analysis engine, reminders may be created for multiple tasks based on the type of event (block 120). By way of example, reminders for tasks associated with a scheduled flight may include a general reminder to be presented a certain time period prior to the scheduled departure tire, a reminder to depart for the airport, a reminder to proceed to the appropriate gate (presenting the most current departure gate information) when the user arrives at the departure airport, a reminder to proceed to the appropriate baggage claim location (presenting the most current baggage claim information) when the user arrives at the destination airport, and/or any other appropriate reminders. Similarly, reminders for tasks associated with a dinner event may include a reminder to call the restaurant before the desired dinner time to be placed on a wait list (the timing for such a reminder may be based on historical waft times for the restaurant based on the day of the week for the dinner event) and a reminder to depart for the restaurant.

After the reminders have been created for the various tasks associated with a particular type of event, the event analysis engine ay monitor changing conditions in order to calculate target conditions (e.g., timing, location, etc.) for the presentation of the reminders (block 125). Target conditions for some tasks may be based solely on static properties. For example, a general reminder for a flight may be presented a predetermined time period prior to the flight departure time (e.g., 24 hours prior to the original scheduled departure time regardless of variations in the estimated actual departure time). These types of reminders may be created with a fixed time and may not be subject to changing conditions. However, other target reminder conditions may be based solely on dynamic properties or on a combination of static and dynamic properties and may therefore need to be updated according to current information. For example, a reminder that presents gate information may be based solely on the arrival of the user at the airport (i.e., a dynamic location property), In such an embodiment, a reminder may be created with no associated time and may be presented when the tracked dynamic condition matches the target condition (e.g., the device is located within a certain range of a coordinate corresponding to the airport). The calculation of target reminder conditions for a reminder to begin driving to the airport to catch a domestic flight may be based on a static property that describes a recommended time of arrival prior to a domestic flight departure time (e.g., one hour) and dynamic properties that describe a current departure tune for the flight, the device location, and a travel time based on traffic conditions between the device location and the airport, The dynamic properties utilized to calculate target conditions for a particular task may be based on device parameters or may be retrieved from a remote source. For example, many electronic devices on which the event analysis engine may be executed regularly identify their location and store the identified location as a device parameter. Accordingly, device location and other similar dynamic properties may be retrieved as a local device parameter. Other dynamic properties utilized to calculate target reminder conditions may be retrieved from a remote source. For example, a departure time for a scheduled flight may be retrieved from an application executing on a remote server device that is regularly updated to provide estimated flight departure times (e.g., a web server operated by an airline or a travel management organization). Similarly, a travel time may be retrieved from an application executing on a remote server device that provides estimated travel times between given locations based on current or historical traffic conditions. The event analysis engine may retrieve dynamic properties from remote sources either directly or indirectly. For example, the event analysis engine may request the information directly from the remote source or may request the information though an application executing on the device (which thereafter retrieves the information from the remote source). In one embodiment, the dynamic properties necessary to calculate target reminder conditions may be retrieved more frequently as existing conditions approach the target conditions (e.g., device location or time). In another embodiment, the target conditions associated with a particular reminder may be tied to the completion of a prior task associated with the event (e.g., the arrival at a destination location associated with a first task may trigger the presentation of a reminder associated with a subsequent task).

When a device parameter such as time or location matches the target condition for a reminder (e.g., the current time matches the target reminder time, the current location matches the target reminder location, etc.), the reminder for the particular task may be presented on a display element of the device. In addition, a notification (e.g., an audible tone) may be generated to alert the user of the device to the display of the reminder, After a reminder is presented, the notification may be repeated according to a predefined frequency (e.g., every five minutes) until the task upon which the reminder is based is completed (block 130). For certain reminders, it may be determined that a task has been completed when the user acknowledges the reminder for the task. For other reminders, it may be determined that a task has been completed when a certain activity in accordance with the task is recognized (e.g., the device location moves towards a destination location associated with the task). In one embodiment, the completion conditions associated with a particular task may be updated (similarly to the target reminder conditions) based on changing retrieved information associated with the task. According to reminder creation operation 100, a recognized user event may be separated into individual tasks and reminders may be created for the individual tasks and presented based on current conditions.

Figure 2:
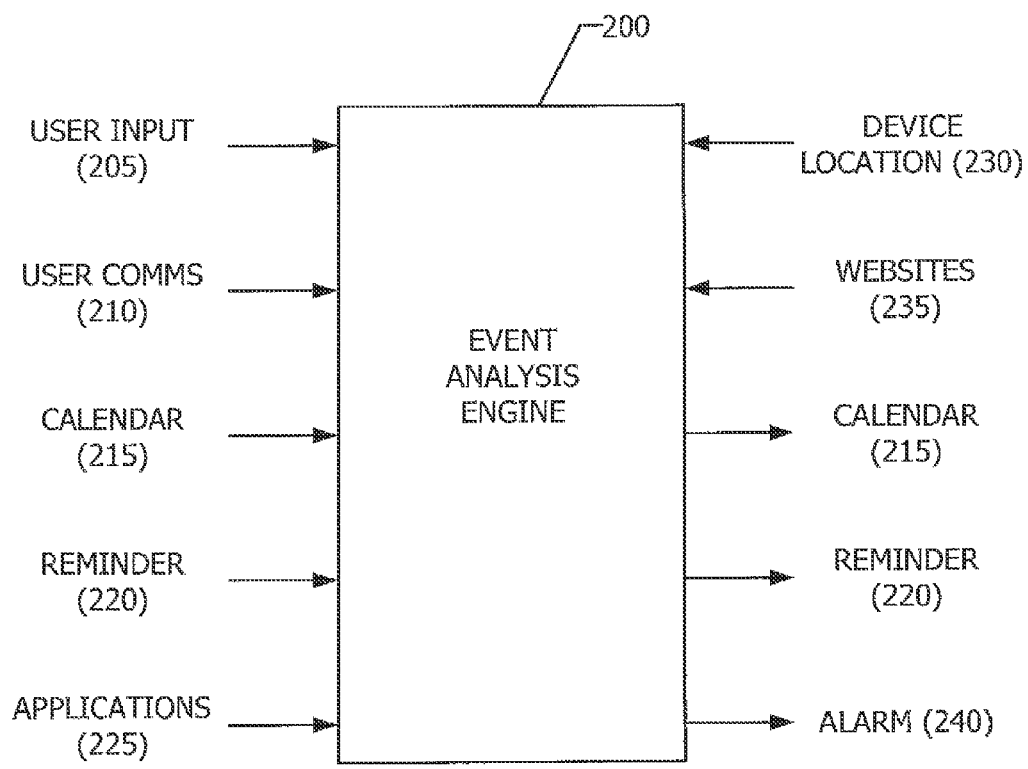
FIG. 2 is a block diagram that illustrates the interactions of an event analysis engine in accordance with one embodiment.

Referring to FIG. 2, the interactions of event analysis engine 200 according to one embodiment are illustrated. As described above with respect to operation 100, event analysis engine 200 receives information representative of a user event, determines a type of event, retrieves information pertaining to the event according to the determined type, generates task-based reminders based on the type of event, and monitors changing conditions in order to update the presentation of generated reminders. In order to perform these functions, event analysis engine 200 may receive information from and provide information to other entities, both internal and external to the device on which event analysis engine 200 executes.

As described briefly above, information representative of a user event may be received by event analysis engine 200 based on a direct user input 205, user communications 210 received by or initiated from the device (e.g., emails, short message service (SMS) text messages, instant messages, social network messages, etc.) or the utilization of device applications (e.g., calendar application 215, reminder application 220, or other third party applications 225). In one embodiment, event analysis engine 200 may regularly request information from device communication and other applications executing on the device. Once it has been determined that received information represents an event of a particular type, additional information may be requested by event analysis engine 200 in order to construct one or more task-based reminders, This information may be retrieved by prompting the user to provide additional information 205, by requesting the information from another application executing on the device (215, 220, and 225), by querying a website 235 using known information, etc. After the task-based reminders have been created, event analysis engine 200 may continue to retrieve information to update the reminders. Such information may include location information 230, information retrieved from a website 235 associated with the event, and information retrieved from another application 225 executing on the device. The reminders may be presented to the user of the device as an output from event analysis engine 200 to a calendar application 215, a reminder application 220, an alarm application 240, or another similar application on the device.

Figure 3:
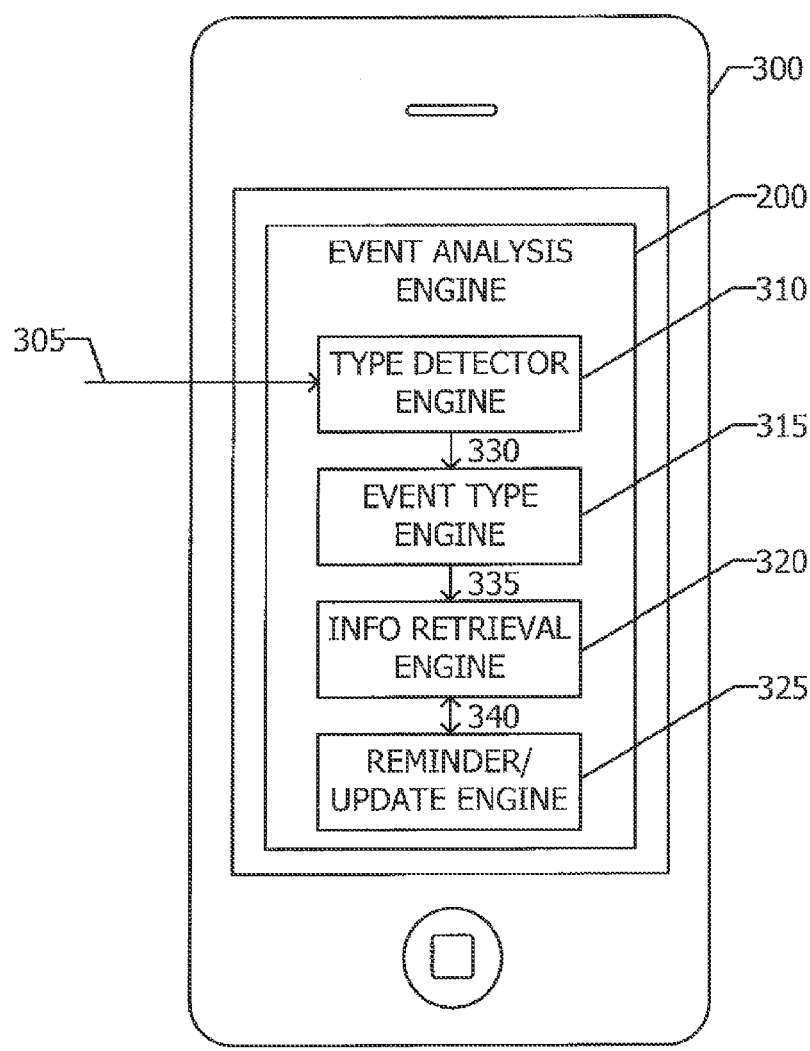
FIG. 3 is a block diagram that illustrates the components of an event analysis engine in accordance with one embodiment.

Referring to FIG. 3, the functionality of various components of event analysis engine 200 is described in accordance with one embodiment. As described above with respect to operation 100, information 305 representative of a user event is received by event analysis engine 200. Information 305 may initially be processed using type detector engine 310 of event analysis engine 200. Type detector engine 310 may include a data store that maintains records that relate different types of predetermined events to information representing the types of events. For example, the data store may contain an entry for a "movie" event that includes keywords that may be extracted from a communication confirming the purchase of tickets for a movie, identifiers of theaters or other parties that are known to be included in payment processing information (which may be received by event analysis engine 200) related to the purchase of movie tickets, and/or designations used by software applications related to the purchase and/or electronic delivery of movie tickets. Thus, data may be extracted from information 305 and processed by type detector engine 310 in order to identify a type of event that information 305 represents.

After an event type is determined, the determined type and the information 305 may be provided to event type engine 315 (330). Event type engine 315 may include a data store that relates event types to one or more tasks associated with the event type. In addition, event type engine 315 may identify information that needs to be retrieved in order to create task-based reminders for the specified tasks and the conditions that must be satisfied before a task is to be identified as complete. For example, the data store associated with event type engine 315 may identify a "general" reminder and a "depart for theater" reminder for a movie event type and may identify the information necessary to provide content and to calculate target conditions for such reminders as the movie name, the device location, the theater location, the movie start time, the drive time between the device location and the theater location (e.g., based on current or historical traffic conditions) and the amount of time prior to the start of the movie that the user should arrive at the theater. The data store may additionally provide algorithms for calculating target conditions (i.e., the target time, location, etc. that a reminder is presented) for the specified task-based reminders using the retrieved information.

In one embodiment, event type engine 315 may identify a full set of tasks that may apply for a particular event type and the retrieved information may be utilized to determine which of the tasks apply for a specific event. For example, a dinner event type may be associated with a reminder to call a certain time period prior to the scheduled event in order to obtain a reservation for restaurants that accept reservations. However, the reminder may not be valid for a restaurant that does not accept reservations. In another embodiment, certain reminders may be contingent upon the calculated reminder time of another reminder. For example, if a calculated reminder time for a reminder pertaining to a user action (e.g., a reminder to begin traveling to an event) occurs during a certain time period (e.g., early morning), an additional wake up reminder may be generated a certain time prior to the related reminder. Therefore, the properties of the particular event may determine which of the set of reminders associated with the determined event type (as identified by event type engine 315) apply to a particular event. The data store associated with event type engine 315 may additionally include information related to alternative options for a particular event. For example, if a user is unable to secure reservations at a desired restaurant, the event analysis engine may generate a reminder to call other restaurants (provided by event type engine 315) of a similar type and at a similar location.

Information 305 and the list of required information needed to generate the task-based reminders identified by event type engine 315 may be passed to information retrieval engine 320 (335). Information retrieval engine 320 may be utilized to obtain information needed to generate the reminders identified by event type engine 315. As described briefly above, some or all of the information needed to generate the identified task-based reminders may be included in information 305. Therefore, information retrieval engine 320 may be configured to extract information identified by event type engine 315 from information 305. In many cases, however, information 305 will not contain all of the required information identified by event type engine 315. In such cases, information retrieval engine 320 may be configured to prompt the user of device 300 for the required information (or information necessary to retrieve the required information) or to interact with other applications executing on device 300 or directly with a remote source via a network connection of device 300 to obtain the required information. The network connection may take any form including, but not limited to, a local area network (LAN), a wide area network (WAN) such as the Internet or a combination of local and wide-area networks. Moreover, the network may use any desired technology, or combination of technologies (wired, wireless or a combination thereof) and protocol (e.g., transmission control protocol, TCP), In one embodiment, information retrieval engine 320 may include a data store that maintains records that guide the information retrieval process. The data store may describe a source (e.g., local application, third party website, local device parameter, etc.) to be utilized to obtain information of a certain type. In addition, the data store may define the structure of a request and any additional information to be included in such a request so as to obtain the specified type of information from the particular source. For example, in response to an indication from event type engine 315 that departure time information is needed to construct one or more task-based reminders for a flight event, information retrieval engine 320 may identify a departure time record in the data store. The departure time record may indicate that the source from which departure time information can be obtained is dependent upon airline information and that any request for departure time information will include flight number and flight date information. If any of the airline, flight number, or flight date information is not known by information retrieval engine 320 (e.g., has not been extracted from information 305), records for those information types may be identified in the data store. Such records may indicate a source for obtaining those types of information (e.g., a user prompt having a certain structure). Upon receiving the airline, flight number, and flight date information, the source and structure of a request to be utilized to obtain the departure time information may be retrieved from the data store. For example, the data store may indicate that, for the particular identified airline, a request including the flight number and flight date should be presented to a particular website associated with the airline. Therefore, upon receipt from event type database 315 of information 305 and a list of information required to generate task-based reminders for the event represented by information 305, information retrieval engine 320 may obtain the required information from various sources.

Once the required information has been retrieved by information retrieval engine 320, the information may be provided to reminder/update engine 325 (340). Reminder/update engine 325 may utilize algorithms for the task-based reminders identified by event type engine 315 in addition to the information provided by information retrieval engine 320 to calculate target reminder conditions for the task-based reminders. Moreover, reminder/update engine 325 may request updated information from information retrieval engine 320 in order to update the content and target reminder conditions for the identified task-based reminders. As noted above, the update frequency for the calculation of target reminder conditions may be increased as current conditions (e.g., current location or time) approach the target reminder conditions. This update frequency may be controlled by reminder/update engine 325. In addition, reminder/update engine 325 may be responsible for utilizing the completion properties provided by event type engine 315 to identify a particular task as completed.

In one embodiment, reminder/update engine 325 may interface with a reminder application executing on device 300 to create the task-based reminders. That is, reminder/update engine 325 may provide reminder content information (e.g., a restaurant phone number, flight gate status, etc.) as well as target reminder conditions to a reminder application that is separate from event analysis engine 200. In such an embodiment, reminder/update engine 325 may provide updated reminder content and target conditions to the reminder application based on updated information received from information retrieval engine 320. In an alternate embodiment, reminder/update engine 325 may include a reminder user interface and the task-based reminders may be generated and presented using the included user interface. Although each of the components of the event analysis engine are illustrated within event analysis engine 200 on device 300 for purposes of clarity, certain component functionality may be performed remotely. In one embodiment, the illustrated components may be implemented as client-side components of event analysis engine 200 that interface with corresponding remote server-side components that perform some or all of the functions described above. Accordingly, event information 305 may be processed using the identified components of event analysis engine 200 to generate task-based reminders for an event represented by information 305.

Figure 4:
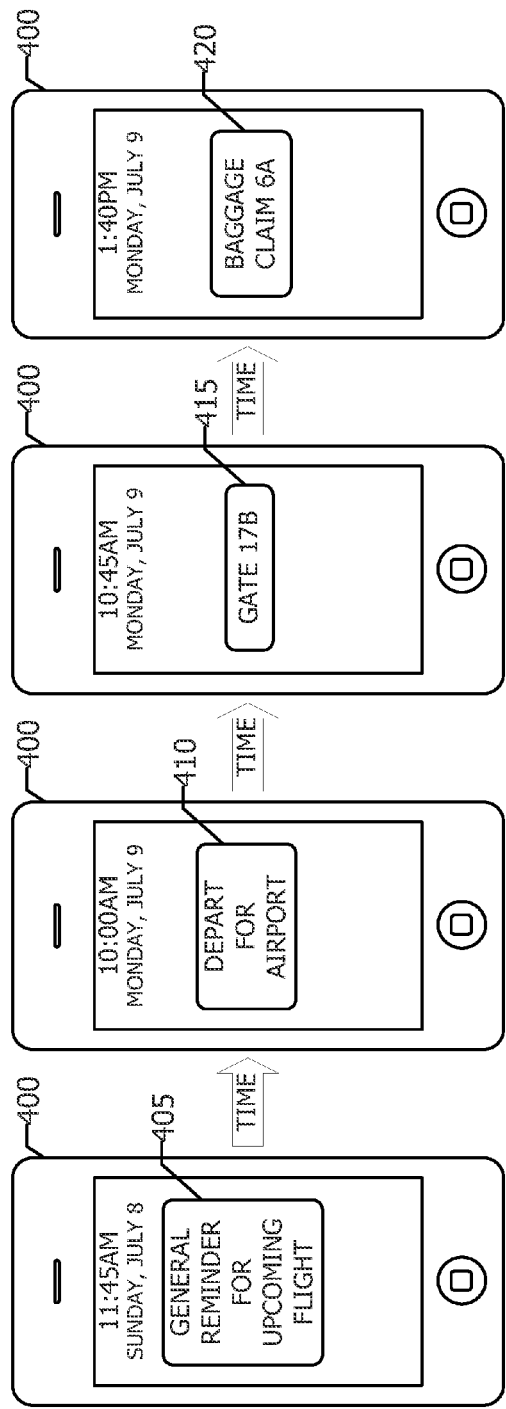
FIG. 4 illustrates example reminders associated with a user event in accordance with one embodiment.
Figure 4:
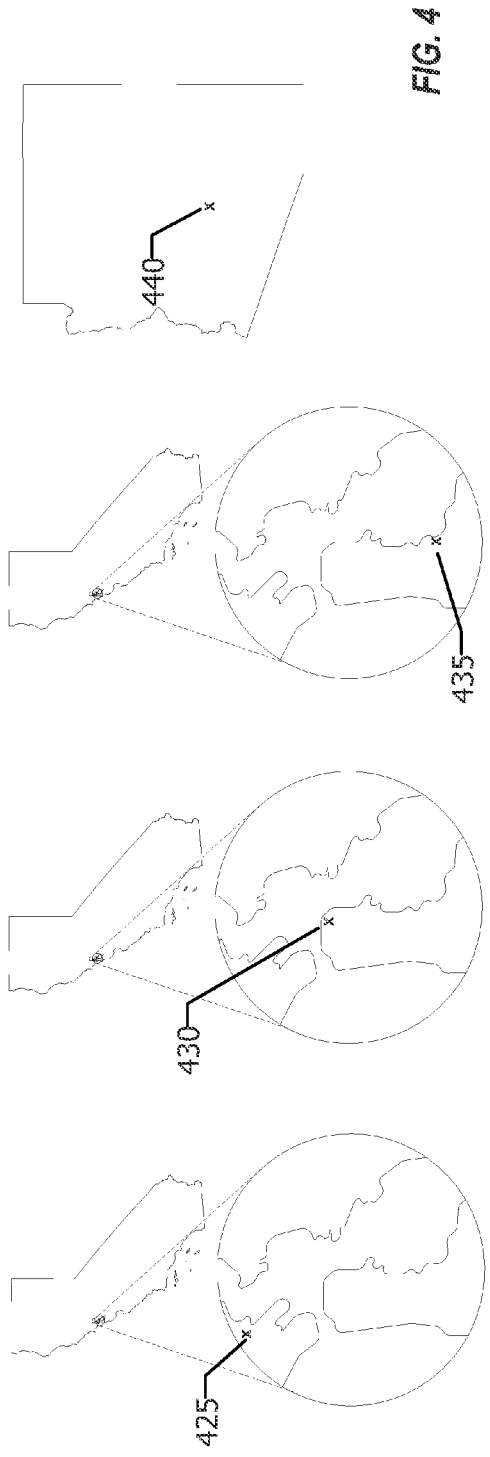

Referring to FIG. 4, several example task-based reminders associated with a user event are illustrated. As described above, information representative of the user event may be received by an event analysis engine executing on device 400. Based on the received information it may be determined that the information is representative of a flight event. The event analysis engine may further determine that the user's flight is a domestic flight from San Francisco International Airport to Phoenix Sky Harbor International Airport and that the flight is scheduled to depart from San Francisco on Monday, July 9 at 11:45 AM. Utilizing this information, the event analysis engine on device 400 may generate several task-based reminders customized for a flight event to present the most current information associated with the flight to the user.

A first general reminder 405 associated with the flight may be presented 24 hours prior to the scheduled departure time for the flight. In one embodiment, reminder 405 may be a static reminder in that its target conditions the conditions according to which the reminder is presented) are not subject to change. That is, reminder 405 may be presented at a fixed time that corresponds to a certain time period prior to the scheduled departure time for the flight. In one embodiment, the user of device 400 may customize static property reminders. For example, the user may specify whether or not a general reminder such as reminder 405 should be presented for a flight event and, if so, the amount of time prior to the scheduled departure time that the reminder should be presented. In another embodiment, reminder 405 may be a dynamic reminder that is updated based on changing departure conditions. For example, reminder 405 may be presented a certain amount of time prior to the most up-to-date departure time for the flight event. The content of reminder 405 may include general information such as the flight number, the airline, and the scheduled departure time to remind the user about the upcoming flight. The user may receive reminder 405 when the device is at location 425 (e.g., the user's home), While the device location may not be included in the calculation of the target reminder condition for reminder 405, it will be recognized that device location may influence the presentation of the additional reminders for the flight. While a user may generally be aware of the upcoming flight, general reminder 405 may prompt the user to begin preparing for the flight (e.g., packing, making arrangements for the time the user will be away from home, etc.). As described above, each reminder may be associated with finder completion properties. Because reminder 405 is not associated with a specific user action, it may be marked as completed upon the user's acknowledgment of the reminder.

On the morning of the flight, the user may stop by their office location 430 before driving to the airport. Utilizing a known typical airport arrival time for domestic flights (e.g., one hour prior to departure) in conjunction with retrieved information regarding the current flight departure time, device 400's location, and the travel time between device 400's location and the departure airport location based on current traffic conditions, the event analysis engine may regularly update the target reminder condition (i.e., the target time) for presentation of a reminder to begin traveling to the airport. When the current time matches the calculated target time, reminder 410 may be presented. In the illustrated embodiment, the event analysis engine may determine that the flight is on schedule (i.e., scheduled to depart at 11:45 AM), that the drive time between device 400's location 430 and the airport location 435 is 45 minutes based on the current traffic conditions, and that the user should arrive one hour prior to the departure time. Accordingly, reminder 410 may be presented at 10:00 AM to prompt the user to depart for the airport. The content of reminder 410 may include information such as a departure terminal and/or parking information to allow the user to proceed to the appropriate location. Although not depicted, an additional reminder may be presented if the event analysis engine determines that the departure time has been delayed by more than a threshold value. Such a reminder may allow the user to be confident that the device is continuing to monitor the flight conditions and that the user does not need to worry about departing for the airport. In one embodiment, the user may be able to customize the properties of reminder 410. For example, the user may be able to adjust static properties such as the amount of time prior to a flight to arrive at the airport, the threshold change in departure time according to which the event analysis engine should present a delayed flight reminder, etc. Additionally, the user may be able to customize the content of reminder 410. For example, a user that will be taking a taxi to the airport may desire terminal drop off information in reminder 410 whereas a user that is driving to the airport may desire parking information in reminder 410. As described above, reminder 410 may have associated completion conditions. In one embodiment, the task associated with reminder 410 may be marked as completed when the user acknowledges the reminder. In another embodiment, the task associated with reminder 410 may be marked as completed when the distance between device 400's location and the airport location decreases by a certain predefined value. Until the task is marked as completed, reminder 410 may continue to be presented on device 400 according to a predefined frequency, which may also be customizable by the user.

The target reminder condition for reminder 415 may be satisfied when device 400's location is within a certain range of the airport location. When the user arrives at airport location 435, reminder 415 may present current departure gate information for the flight. Reminder 415 may allow the user to proceed to the correct security area and then to the correct departure gate. The task associated with reminder 415 may be marked as completed based on user acknowledgment of reminder 415, when the device location is within a certain range of the departure gate, when the current time is later than the departure time, etc.

Like reminder 415, the target reminder condition for reminder 420 may be based on device location. When device 400's location corresponds to arrival airport location 440, reminder 420 may display current baggage claim information. Reminder 420 may allow the user to proceed to the correct baggage claim location to retrieve theft luggage. The completion conditions for the task associated with reminder 420 may be satisfied by user acknowledgment, when the device location is within a certain range of the correct baggage claim location, when the device is more than a specified distance away from the destination airport, etc. Because reminder 420 is the last reminder associated with the flight event, when reminder 420 is marked as complete, the event analysis engine might also mark the flight event as complete.

While FIG. 4 has provided example reminders associated with a flight event, it will be recognized that the techniques disclosed herein may apply to any number of events for which a user may desire task-based reminders. For any event, a type of event may be identified and one or more predefined reminders associated with the identified type of event may be presented to the user. The event analysis engine may monitor changing conditions such that the reminders may present the most current information at the most appropriate time. Moreover, reminders may be repeated until completion conditions indicate that the user has completed a task associated with the reminder.

Figure 5:
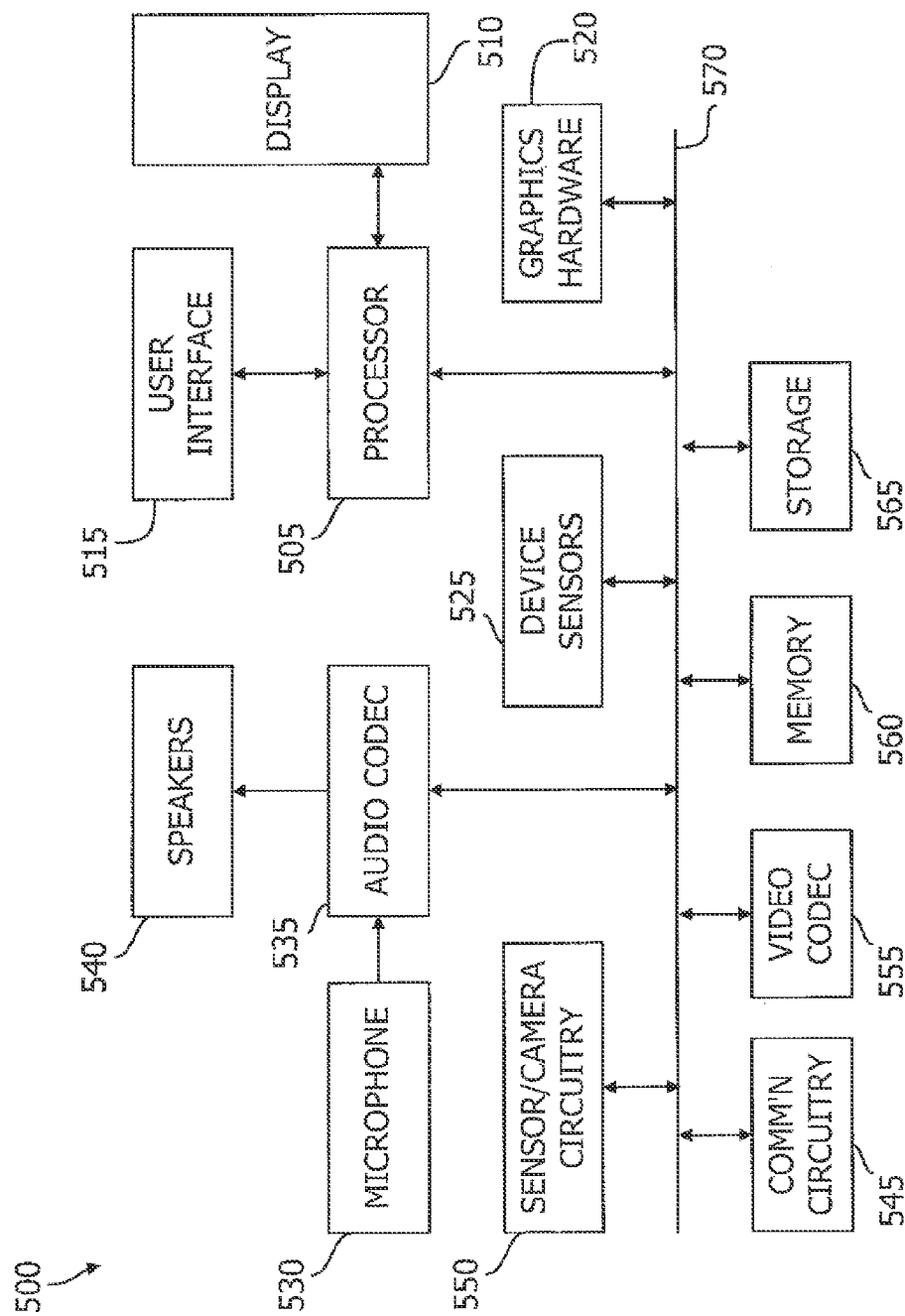
FIG. 5 is a block diagram of an illustrative electronic device in accordance with one embodiment.

Referring to FIG. 5, a simplified functional block diagram of illustrative electronic device 500 is shown according to one embodiment. Electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550, video codec(s) 555, memory 560, storage 565, and communications bus 570. Electronic device 500 may be, for example, a personal digital assistant (PDA), personal music player, mobile telephone, notebook, laptop or tablet computer. More particularly, the event analysis engine may be executed on a device that takes the form of device 500.

Processor 505 may execute instructions necessary to carry out or control the operation of many functions performed by device 500. Processor 505 may, for instance, drive display 510 and receive user input from user interface 515. User interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information, In one embodiment, graphics hardware 520 may include a programmable graphics processing unit (GPU).

Sensor and camera circuitry 550 may capture still and video images that may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods (such as operation 100) described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
   receive, at the one or more processors a first information representing a user event;
   determine an event type for the user event based, at least in part, on the first information;
   determine a set of tasks associated with the event type identified for the user event;
   automatically filter out at least one task from the set of tasks not associated with the user event to create a set of second tasks that apply to the user event;
   retrieve second information specific to at least one task from the set of second tasks to generate a reminder with the one or more processors corresponding to the at least one task from the second set of tasks;
   calculate a target condition for the reminder based, at least in part, on the second information; and
   display, using the one or more processors, the reminder from a determination that a current condition approaches the target condition.

2. The non-transitory program storage device of claim 1, wherein the instructions cause the one or more processors to receive the first information as an input from a user of the device.

3. The non-transitory program storage device of claim 1, wherein the instructions cause the one or more processors to obtain the first information, at least in part, from a source external to the device.

4. The non-transitory program storage device of claim 1, wherein the instructions to cause the one or more processors to determine the event type is further based, at least in part, on a data store stored on the non-transitory program storage device, wherein the data store comprises a plurality of pre-defined event types for automatically determining the event type for the user event based, at least in part, on the first information.

5. The non-transitory program storage device of claim 1, wherein the instructions to cause the one or more processors to retrieve the second information by performing at least the following: retrieving a destination location associated with the task.

6. The non-transitory program storage device of claim 5, wherein the instructions to cause the one or more processors to retrieve the second information by performing at least the following: retrieve a travel time between a device location and the destination location.

7. The non-transitory program storage device of claim 1, wherein the instructions cause the one or more processors to update the target condition as a dynamic target condition by continuously monitoring changes in the target condition.

8. The non-transitory program storage device of claim 7, wherein the dynamic target condition is dependent, at least in part, on an event or condition external to the device.

9. The non-transitory program storage device of claim 7, wherein the dynamic target condition is triggered for completion, at least in part, on completion of at least one prior task associated with the user event, and wherein the reminder is displayed after the completion of the at least one prior task associated with the user event.

10. The non-transitory program storage device of claim 1, further comprising instructions to cause the one or more processors to:
identify a plurality of completion conditions associated with the at least one task from the set of second tasks that correspond to the reminder;
determine whether the completion conditions have been satisfied; and
identify the at least one task from the set of second tasks that corresponds to the reminder as complete when the completion conditions are satisfied.

11. The non-transitory program storage device of claim 1, further comprising instructions to cause the one or more processors to:
determine a condition relevant to the at least one task from the set of second that corresponds to the reminder has changed; and
update a target completion condition for the at least one task from the set of second that corresponds to the reminder.

12. The non-transitory program storage device of claim 1, wherein the reminder is continuously displayed as the current condition approaches the target condition, and wherein a frequency of displaying the reminder increases as the current condition nears the target condition.

13. A method, comprising:
receiving, by one or more processors of a user device, first information representative of a user event;
determining, by the one or more processors, an event type for the user event based, at least in part, on the first information;
determining, by the one or more processors, a set of tasks associated with the event type identified for the user event;
automatically removing, by the one or more processors, at least one task from the set of tasks not related with the user event to create a set of second tasks that apply to the user event;
retrieving, by the one or more processors, second information corresponding to the user event;
creating, by the one or more processors, a reminder on the user device for one or more tasks of the set of second tasks associated with the determined event type; and
generating, by the one or more processors, a notification on the user device for each of the reminders, wherein the notification for each of the reminders is generated based, at least in part, on the second information.

14. The method of claim 13, wherein the act of retrieving second information corresponding to the user event comprises retrieving the second information from a remote source.

15. The method of claim 13, wherein the act of retrieving second information corresponding to the user event comprises retrieving the second information from an application installed on the user device.

16. The method of claim 13, wherein the notification is continuously generating by the one or more processors, and wherein a frequency of generating the notification increases as the current conditions nears the target conditions.

17. The method of claim 13, wherein determining, by the one or more processors, the event type for the user event based, at least in part, on the first information comprises automatically selecting the event type from a plurality of pre-defined event types stored on a data store using the first information.

18. A device, comprising:
a memory;
a display element; and
one or more processors operatively coupled to the memory and the display element and configured to execute program code stored in the memory to:
receive first information representing an event associated with the device;
determine an event type for the event based, at least in part, on the first information;
identify a plurality of tasks associated with the event type;
automatically determine whether at least one task from the plurality of tasks represent at least one user event task that corresponds to the user event;
retrieve the second information specific to the at least one user event task, wherein the at least one user event task has a corresponding reminder with a target condition based, at least in part, on the second information specific to the least one user event task; and
display, on the display element of the device, the reminder for the at least one user event task when a current device parameter approaches the target condition.

19. The device of claim 18, wherein the target condition is a dynamic target condition that continuously updates the target condition by continuously monitoring changes in the target condition.

20. The device of claim 19, wherein the dynamic target condition is dependent, at least in part, on a condition external to the device.

21. The device of claim 19, wherein the dynamic target condition is dependent, at least in part, on completion of at least one prior task associated with the user event.

22. The device of claim 18, further comprising program code to cause the one or more processors to:

identify a plurality of completion condition for the at least one user event task;

determine whether the completion condition for the at least one user event task has been satisfied after the reminder corresponding to the at least one user event task has been displayed; and identify the at least one user event task as completed when determining that the completion condition has been satisfied.

23. The device of claim 18, further comprising program code to cause the one or more processors to repeat the display of the reminder on the display element of the device until the at least one user event task that corresponds to the reminder is identified as complete, wherein a frequency of displaying the reminder increases as the current condition nears the target condition.

24. The device of claim 18, wherein the program code causes the one or more processors to determine an event type for the event a type of event based by automatically selecting the event type from a plurality of pre-defined event types stored on a data store based, at least in part, on the first information.

* * * * *

UNITED STATES PATENT AND TRADEMARK OFFICE
CERTIFICATE OF CORRECTION

PATENT NO. : 9,460,608 B2  
APPLICATION NO. : 13/613586  
DATED : October 4, 2016  
INVENTOR(S) : Swapnil Dave et al.

Page 1 of 1

It is certified that error appears in the above-identified patent and that said Letters Patent is hereby corrected as shown below:

In the Claims

Column 13, Line 49: insert the word --tasks-- after the phrase "the set of second";

Column 13, Line 52: insert the word --tasks-- after the phrase "the set of second";

Column 14, Line 25: delete the word "nears" and insert the word --near--;

Column 15, Line 1: delete the word "condition" and insert the word --conditions--;

Column 15, Line 3: delete the word "condition" and insert the word --conditions--;

Column 15, Line 19: delete the phrase "a type of event based".

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*